(12) United States Patent
Evels et al.

(10) Patent No.: US 9,283,881 B2
(45) Date of Patent: Mar. 15, 2016

(54) FITTING PART FOR A VEHICLE SEAT, AND A VEHICLE SEAT

(71) Applicant: Johnson Controls GmbH, Burscheid (DE)

(72) Inventors: Sebastian Evels, Wuppertal (DE); Marco Leber, Sankt Augustin (DE); Ralf Rappen, Leverkusen (DE); Frank Gerhardt, Köln (DE); Ahmed Oualkadi, Velbert (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 14/383,256

(22) PCT Filed: Mar. 7, 2013

(86) PCT No.: PCT/EP2013/054655
§ 371 (c)(1),
(2) Date: Sep. 5, 2014

(87) PCT Pub. No.: WO2013/132027
PCT Pub. Date: Sep. 12, 2013

(65) Prior Publication Data
US 2015/0028635 A1    Jan. 29, 2015

(30) Foreign Application Priority Data

Mar. 7, 2012   (DE) .......................... 10 2012 004 342

(51) Int. Cl.
*A47B 83/02*    (2006.01)
*B60N 3/00*    (2006.01)
*B60N 2/22*    (2006.01)

(52) U.S. Cl.
CPC . *B60N 3/004* (2013.01); *B60N 2/22* (2013.01)

(58) Field of Classification Search
CPC .................................. B60N 3/004; B60N 2/22
USPC ......................................... 297/146, 163, 169
See application file for complete search history.

(56) References Cited

U.S. PATENT DOCUMENTS

| 2,173,569 | A | | 9/1939 | Troendle | |
|---|---|---|---|---|---|
| 2,798,780 | A | | 7/1957 | Motorney | |
| 4,519,648 | A | * | 5/1985 | Jovanovic | ..................... 297/146 |
| 4,792,183 | A | * | 12/1988 | Townsend, III | ................ 297/163 |
| 5,046,433 | A | * | 9/1991 | Kramer et al. | ............ 297/163 X |
| 5,857,740 | A | * | 1/1999 | Duboulet | ....................... 297/163 |
| 5,931,527 | A | * | 8/1999 | D'Onofrio et al. | ........... 297/146 |
| 6,135,548 | A | * | 10/2000 | McGuire | ....................... 297/163 |
| 7,651,160 | B2 | * | 1/2010 | Okumura et al. | ............. 297/163 |
| 2015/0108798 | A1 | * | 4/2015 | Boyer, Jr. | ....................... 297/163 |

FOREIGN PATENT DOCUMENTS

| DE | 297 07 389 U1 | 6/1997 |
|---|---|---|
| DE | 10 2009 006 906 A1 | 8/2009 |
| FR | 2 820 376 A1 | 8/2002 |
| JP | 2002 154 362 A | 5/2002 |

* cited by examiner

*Primary Examiner* — Rodney B White
(74) *Attorney, Agent, or Firm* — McGlew and Tuttle, P.C.

(57) ABSTRACT

A fitting part for a vehicle seat includes a flap element that is rotatably secured to a backrest of the vehicle seat and can be pivoted between a substantially horizontal use position and a non-use position, as well as a retainer element (11) for locking the flap element in the use position. A first region (10) of the retainer element is rotatably secured to the backrest and a second region (13) of the retainer element is rotatably secured to a slide (7) that is mounted so as to be displaceable in a rail (6) of the flap element and that can be fixed relative to the rail by a securing element. The fitting part includes a plurality of securing elements for locking the flap element in a plurality of use positions.

7 Claims, 3 Drawing Sheets

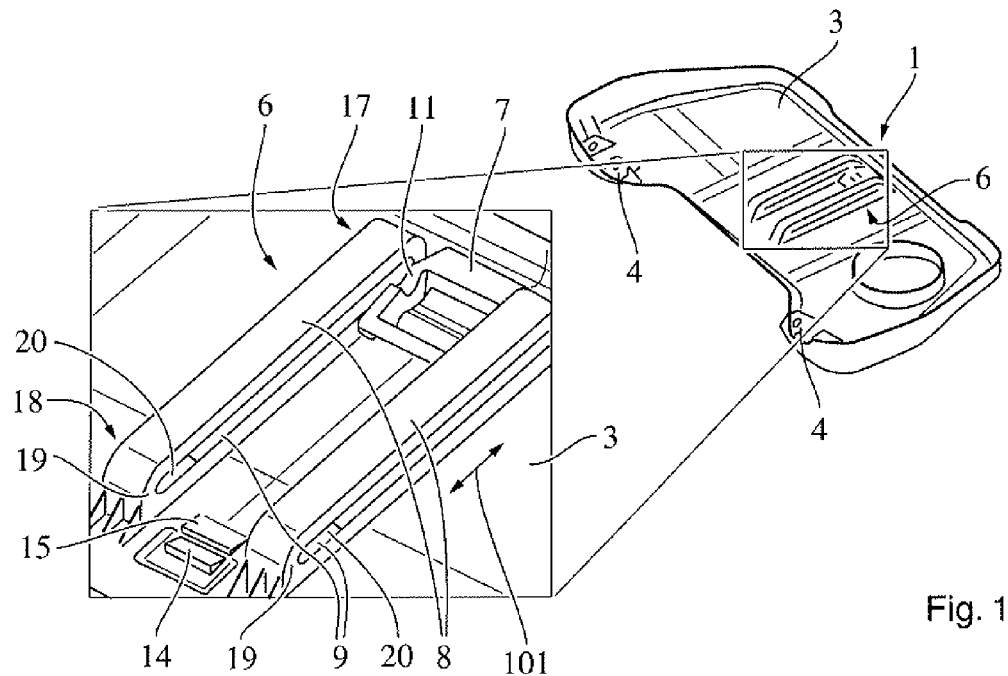
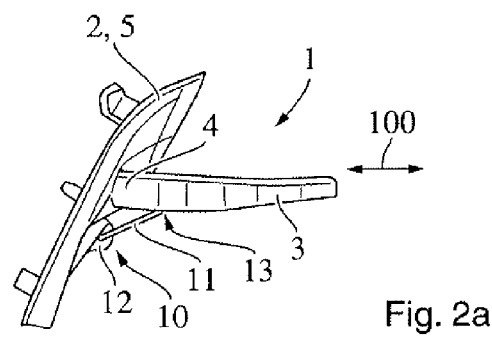
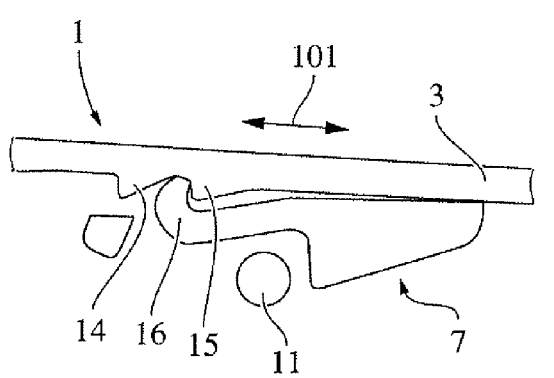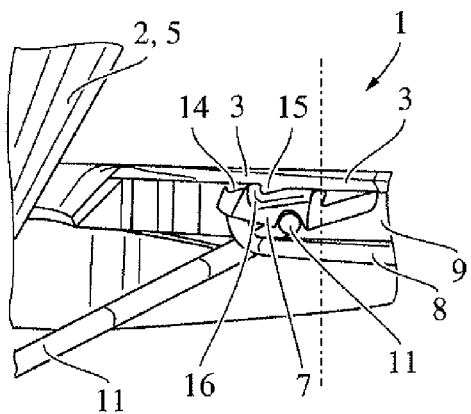
Fig. 1
Fig. 2a
Fig. 2b
Fig. 2c

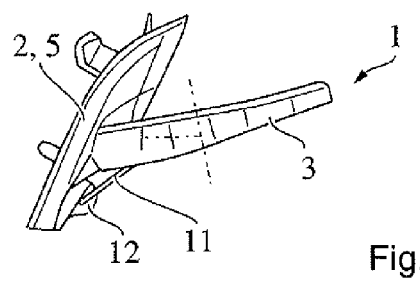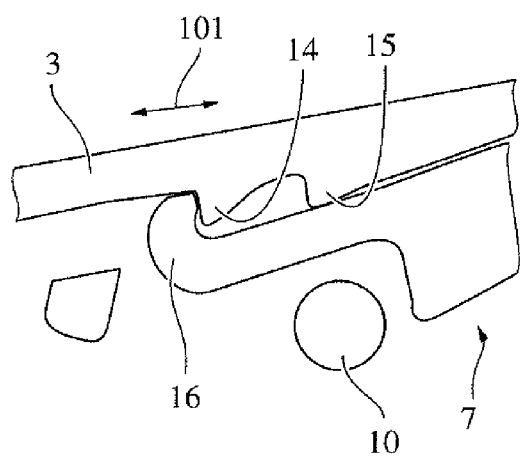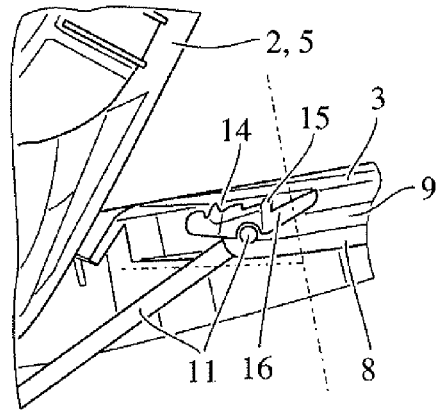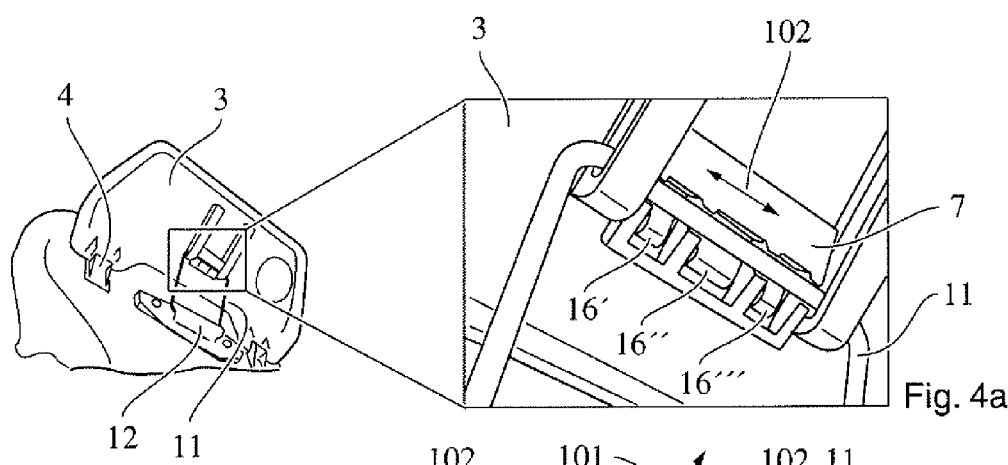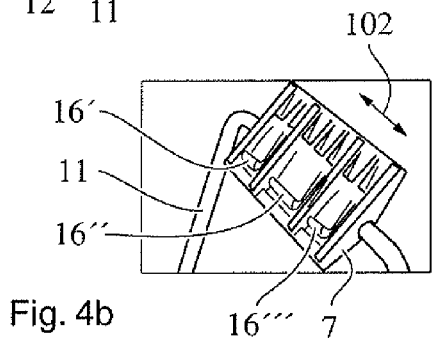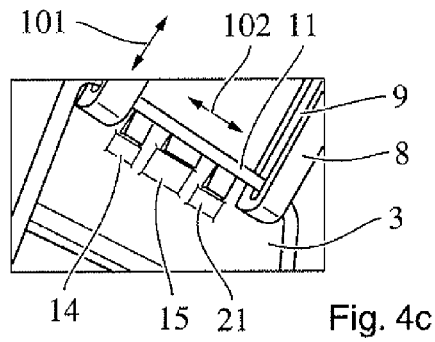

FITTING PART FOR A VEHICLE SEAT, AND A VEHICLE SEAT

CROSS REFERENCE TO RELATED APPLICATIONS

This application is a United States National Phase Application of International Application PCT/EP2013/054655 filed Mar. 7, 2013 and claims the benefit of priority under 35 U.S.C. §119 of German Patent Application DE 10 2012 004 342.2 filed Mar. 7, 2012, the entire contents of which are incorporated herein by reference.

FIELD OF THE INVENTION

The invention is based on a fitting part for a vehicle seat, the fitting part comprising a flap element which is rotatably secured to a backrest of the vehicle seat and which can be pivoted between a substantially horizontal use position and a non-use position, and a retainer element for locking the flap element in the use position, wherein a first region of the retainer element is rotatably secured to the backrest, and wherein a second region of the retainer element is rotatably secured to a slide which is slidably mounted in a rail arrangement of the flap element and can be fixed relative to the rail arrangement by means of a securing element.

BACKGROUND OF THE INVENTION

Such fitting parts are generally known from the prior art and are used, for example, for making available a foldable table surface on the rear of a vehicle seat backrest. The fitting part comprises for this purpose a flap element which is embodied in the manner of a tabletop and which can be pivoted between a non-use position and a use position. In the non-use position, the flap element is arranged parallel to the backrest with the result that the sitting space for a vehicle occupant sitting on a rear seat bench behind is not restricted. The vehicle occupant can transfer the flap element from the non-use position into a substantially horizontal use position in which the flap element serves as a table surface for the vehicle occupant. In the use position, the flap element is fixed by means of a retainer element, with the result that undesired folding back of the flap element into the non-use position is prevented owing to weight acting on the flap element.

A disadvantage with such fitting parts, is that horizontal orientation of the flap element can be ensured only if the backrest has a precisely defined angle of inclination relative to the horizontal. Adjustment of the backrest inclination, for example for comfort adjustment for a further vehicle occupant sitting on this vehicle seat, leads to a situation in which the flap element can no longer be oriented horizontally.

In order to avoid this problem, fitting parts which are not secured directly to the backrest, but are instead pivotably secured to additional carrier elements which are each rigidly connected to a seat part of the vehicle seat on both sides of the vehicle seat are known from the prior art. Such a design is comparatively complex and costly.

SUMMARY OF THE INVENTION

An object of the present invention is therefore to make available a fitting part for a vehicle seat, which fitting part can always be locked in a substantially horizontal position in its use position, and can be implemented comparatively compactly in terms of installation space, easily and cost-effectively.

This object is achieved with a fitting part for a vehicle seat, comprising a flap element which is rotatably secured to a backrest of the vehicle seat and which can be pivoted between a substantially horizontal use position and a non-use position, and a retainer element for locking the flap element in the use position, wherein a first region of the retainer element is rotatably secured to the backrest, and wherein a second region of the retainer element is rotatably secured to a slide which is slidably mounted in a rail arrangement of the flap element and can be fixed relative to the rail arrangement by means of a securing element, wherein the fitting part has a plurality of securing elements for locking the flap element in a plurality of use positions.

The slide is advantageously capable of being secured in various positions relative to the rail arrangement, with the result that the retainer element is at various angles relative to the flap element, and the flap element can therefore be retained in various use positions by the retainer element. As a result of the plurality of settable use positions, the vehicle occupant is then always capable of finding, even in the case of different angles of inclination of the backrest, a locking position in which the flap element is oriented virtually horizontally. At the same time, a comparatively simple design of the fitting part, which is cost-effective to implement, is realized. The flap element preferably comprises a tabletop.

Advantageous refinements and developments of the invention can be found in the dependent claims as well as the description with reference to the drawings.

According to one preferred embodiment of the present invention there is provision that the plurality of securing elements comprise a plurality of detents, wherein each detent is provided for latching with the slide in one of the plurality of use positions. The detents are preferably each formed on a side of the flap element facing the rail arrangement, wherein the detents are arranged in a row in particular in a direction of main extent of the rail arrangement. The slide preferably has at least one opposing detent element faces the flap element and is configured to optionally latch with one of the detents. The detents are advantageously oriented in such a way that the slide or the opposing detent element can pass the detents without being impeded if the flap element is moved from the non-use position into the use position while, when the flap element is to be moved from the use position into the non-use position, the slide which is moved in the opposing direction can pass the detents only if an increased force is applied to the flap element by the user in the direction of the non-use position. This increased force, which has to be applied in order to fold the flap element away from the user, is, in particular, significantly larger than those forces which typically act on the flap element which is located in the use position during a "normal" use situation. It is conceivable that the opposing detent element has a certain degree of elasticity for this purpose. However, it would also alternatively be conceivable that the detents are oriented in such a way that the slide or the opposing detent element can pass the detents without impedance if the flap element is moved from the non-use position into the use position, while, when the flap element in the use position has force applied to it in the direction of the non-use position, the slide which is moved in the opposing direction can pass the detents only if the retainer element is slightly lifted up by the vehicle occupant, with the result that the at least one opposing detent element can disengage from the detent elements and therefore move away over the detents. By correspondingly applying force to the flap element, and/or lifting up or releasing the retainer element, the vehicle occupant can then search for any desired angular position of the flap element relative to the backrest (the vehicle occupant will search for that position in which the flap element is oriented virtually horizontally) in which the opposing detent element then latches with a corresponding detent element.

According to one preferred embodiment of the present invention, there is provision that at least a first detent and a second detent are offset with respect to one another in a transverse direction which is perpendicular to the direction of main extent, and wherein the slide has at least a first opposing detent element and a second opposing detent element which are offset with respect to one another in the transverse direction, wherein the first and the second detents and/or the first and the second opposing detent elements are offset with respect to one another in the direction of main extent. It is therefore advantageously possible to make available various latching positions which are closer to one another and are spaced less far apart from one another, in order to be able to carry out even small angular corrections in the orientation of the flap element. In particular the detent elements do not have to be at least one detent element apart from one another since they can overlap in the transverse direction. It is also conceivable that the opposing detent elements overlap one another in the transverse direction.

A further embodiment, or a further subject matter of the present invention, is a fitting part for a vehicle seat, comprising a flap element which is rotatably secured to a backrest of the vehicle seat and which can be pivoted between a substantially horizontal use position and a non-use position, and a retainer element for locking the flap element in the use position, wherein a first region of the retainer element is rotatably secured to the backrest, and wherein a second region of the retainer element is rotatably secured to a slide which is slidably mounted in a rail arrangement of the flap element and can be fixed relative to the rail arrangement by means of a securing element, wherein the slide has a functional cam in which the second region of the retainer element is guided in such a way that in the use position the second region can be fixed in at least two different positions relative to the slide.

The flap element can therefore also advantageously be locked in at least two different use positions, making it possible to adapt the orientation of the flap element with respect to the angle of the inclination of the backrest. In particular, adaptation in particularly small angular ranges is made possible by the functional cam which is embodied as a control cam. The rail arrangement preferably has an elongate hole guide which extends in the direction of main extent and in which a guide bolt of the slide and/or the retainer element which is connected to the slide is displaceably guided, wherein the elongate hole guide has in an end region at least one cutout in the direction of the backrest for forming the functional cam. In the use position, the opposing detent element of the slide latches with a detent of the flap element, wherein the second region can be fixed either to the end of the elongate hole guide or in the cutout, in order to set different orientations of the flap element. The functional cam is embodied, in particular, in such a way that when the flap element is transferred from the non-use position into the use position the bolt firstly moves into the cutout and remains there. If the vehicle occupant then lifts up the flap element briefly, the bolt is pushed out of the cutout into the end region of the elongate hole and remains there. It is conceivable for the slide to have a multiplicity of further cutouts in order to permit further angular positions of the flap element.

According to one preferred embodiment of the present invention, there is provision that the rail arrangement comprises a further functional cam which is arranged essentially congruently with the functional cam when the slide has assumed a functional position relative to the rail arrangement, wherein in the functional position preferably one detent of the flap element is latched to an opposing detent element of the slide, and the flap element is arranged substantially horizontally. The functional cam and the further functional cam are preferably embodied in substantially the same way, with the result that the bolt is connected both to the slide and to the rail arrangement in the most stable fashion possible.

A further subject matter of the present invention is a vehicle seat comprising a fitting part according to the invention.

Further details, features, and advantages of the invention can be found in the drawings and the subsequent description of preferred embodiments with reference to the drawings. The drawings illustrate here merely exemplary embodiments of the invention which do not restrict the essential inventive concept.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view of a fitting part according to an exemplary first embodiment of the present invention;

FIG. 2a is a schematic view of the fitting part according to the exemplary first embodiment of the present invention in a first use position;

FIG. 2b is a schematic view of the fitting part according to the exemplary first embodiment of the present invention in the first use position;

FIG. 2c is a schematic view of the fitting part according to the exemplary first embodiment of the present invention in the first use position;

FIG. 3a is a schematic view of the fitting part according to the exemplary first embodiment of the present invention in a second use position;

FIG. 3b is schematic view of the fitting part according to the exemplary first embodiment of the present invention in the second use position;

FIG. 3c is a schematic view of the fitting part according to the exemplary first embodiment of the present invention in the second use position;

FIG. 4a is a schematic view of a fitting part according to an exemplary second embodiment of the present invention;

FIG. 4b is another schematic view of the fitting part according to the exemplary second embodiment of the present invention;

FIG. 4c is still another schematic view of the fitting part according to the exemplary second embodiment of the present invention;

DESCRIPTION OF THE PREFERRED EMBODIMENTS

Figures 5A, 5B, 5C:
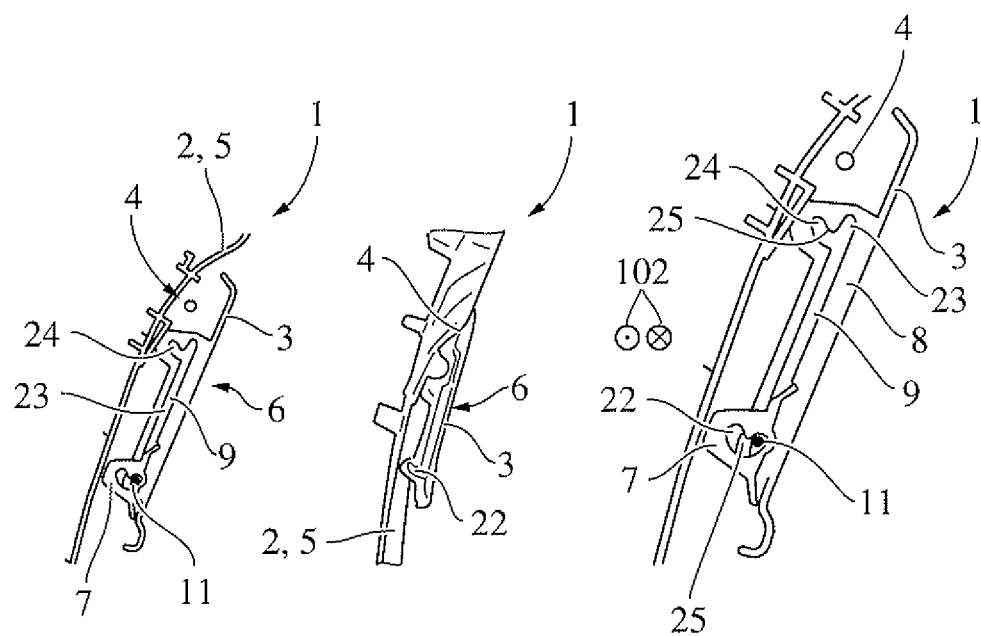
FIG. 5a is a schematic view of a fitting part according to an exemplary third embodiment of the present invention.
FIG. 5b is another schematic view of the fitting part according to the exemplary third embodiment of the present invention.
FIG. 5c is a schematic view of the fitting part according to the exemplary third embodiment of the present invention.

In the various Figures, identical parts are always provided with the same reference symbols and are therefore generally also each specified or mentioned only once.

FIG. 1 shows a schematic view and a detailed view of a fitting part 1 for a vehicle seat 2 according to an exemplary first embodiment of the present invention. The fitting part 1 comprises a flap element 3 which is to be rotatably secured to a backrest 5 of the vehicle seat 2 by means of two hinges 4. The flap element 3 can be pivoted by means of the hinges 4 between a non-use position and two different use positions (each illustrated in FIGS. 2a and 3a). In the non-use position, the flap element 3 bears against the backrest 5 in parallel with respect to the backrest 5, while in the use positions the flap element 3 protrudes from the backrest 5 in a substantially horizontal plane 100. In the use position, the flap element 3 functions as a table surface for a vehicle occupant (not illustrated) who is seated behind the vehicle seat, for example on a rear seat bench.

In the use positions, the flap element 3 is supported by a retainer element 11. A first region 10 of the retainer element 11 is itself connected to the backrest 5 so as to be rotatable by means of a joint 12, wherein the rotational axis of the joint 12 and the rotational axis of the hinges 4 are spaced apart from one another along the backrest 5. A second region 13 of the retainer element 11 is rotatably attached to a slide 7. The retainer element 11 is embodied, in particular, as a spring element in the form of a wire clip. The flap element 3 has, on its underside, a rail arrangement 6 in which the slide 7 is guided in a longitudinally spaceable fashion in a direction 101 of main extent. The rail arrangement 6 comprises two wall elements 8 which run parallel to one another and in each of which a guide elongate hole 9 is formed. The retainer element 1 is guided in a displaceable fashion in the guide elongate holes 9, wherein the second region 13 of the retainer element 11 is arranged between the wall elements 8 and runs through a passage duct formed in the slide 7. The slide 7 is displaceably mounted in the rail arrangement 6 by means of the retainer element 11, wherein the retainer element 11 can rotate both with respect to the rail arrangement 6 and with respect to the slide 7. Two detents, a first detent 14 and a second detent 15, are arranged on the underside of the flap element 3, between the wall elements 8. The slide 7 has, on its side facing the flap element 3, a complementary opposing detent element 16 (not shown in FIG. 1 for reasons of perspective) which can enter with one of the two detents 14, 15 into a latching connection for locking the flap element 3 in the use positions (illustrated in FIGS. 2b and 3b).

In the non-use position, the slide 7 is moved in the direction of a first end 17 of the rail arrangement 6. The retainer element 11 is then oriented essentially parallel to the flap element 3. If a vehicle occupant would then like to use the flap element 3 as a table, the vehicle occupant pivots the flap element 3 from the non-use position in the direction of the use position in which the flap element 3 protrudes from the backrest 5. Owing to the distance between the hinges 4 and the joint 12, the second region 13 of the retainer element 11 is pulled back here relative to the flap element 3 in the direction of the backrest 5. As a result, the slide 7 is moved in the direction 101 of main extent from the first end 17 of the rail arrangement 6 in the direction of a second end 18. In the region of the second end 18, the two detents 14, 15 are arranged. The slide 7 is pushed over the detents 14, 15, with the result that the opposing detent element 16 slips at least over the second detent 15 or over both detents 14, 15.

If the vehicle occupant then releases the flap element 6, the opposing detent element 16 enters into engagement either with the first detent 14 or with the second detent 15. The detents 14, 15 are embodied in a sharktooth shape such that latching occurs only in the event of application of a force to the opposing detent element 16 in the direction of the first end 17, while the detents 14, 15 can pass unimpeded in the event of a movement of the opposing detent element 16 from the first end 17 in the direction of the second end 18. By means of the time of release, it is possible for the vehicle occupant to determine whether the opposing detent element 16 is to enter into engagement with the first detent 14 or with the second detent 15. The flap element 3 is then supported by the retainer element 11 via the connection between one of the two detents 14, 15 and the opposing detent element 16. The flap element 3 can then be loaded and functions as a table surface. If the flap element 3 is to be moved back into the non-use position, the vehicle occupant must press the flap element 3 with increased force in the direction of the non-use position, with the result that the slide 7 moves up to the end stops 19 of the guide elongate holes 9. The guide elongate holes 9 have, in the region of the end stops 19, a type of ramp region 20 by which the slide 7 is moved a certain distance away from the underside of the flap element 3. The clip region of the retainer element 11 slips here along the guide faces of the guide elongate holes 9 facing away from the detents 14, 15.

In the same way, the vehicle occupant can also control whether the opposing detent element 16 is to enter into engagement with the first detent 14 or with the second detent 15. In this way, lowering of the flap element 6 which is carried out with force by the user can cause the opposing detent element 16 to disengage from the first detent 14 and enter into engagement with the second detent 15. Conversely, briefly lifting up the flap element 6 is sufficient to disengage the opposing detent element 16 from the second detent 15 and make it engage with the first detent 14. The two detents 14, 15 are arranged one behind the other in the direction 101 of main extent, with the result that the orientation of the flap element 3 relative to the horizontal can advantageously be set by selecting the corresponding detent 14, 15. The fitting part 1 preferably has a multiplicity of such detents 14, 15 which are arranged in a row between the wall elements 8 in the direction 101 of main extent, with the result that the vehicle occupant always finds a latching position between the opposing detent element 16 and a detent in which the flap element 3 is always oriented substantially horizontally, without the inclination of the backrest 5 having to be adapted for this purpose. The inclination of the backrest 5 can therefore be selected freely for comfort adjustment, wherein at the same time a horizontal orientation of the flap element 3 is possible.

The fitting part 1 is, in particular, part of the vehicle seat 2 for a motor vehicle (not illustrated).

FIGS. 2a, 2b and 2c show schematic views of the described fitting part 1 in a first use position. In this first use position, the opposing detent element 16 is latched with the second detent 15. This circumstance can be seen clearly, in particular, in FIG. 2b. The flap element 3 is accordingly secured at a specific angle relative to the backrest 5.

FIGS. 3a, 3b and 3c show schematic views of the described fitting part 1 in a second use position. In this second use position, the opposing detent element 16 is latched with the first detent 15. Accordingly, the flap element 3 is fixed in turn at a specific angle relative to the backrest 5, wherein the angle in the second use position differs from the angle in the first use position, with the result that depending on the inclination of the backrest 5 the angle between the flap element 3 and the backrest 5 can be varied in order always to find substantially horizontal orientation of the flap element 3.

FIGS. 4a, 4b and 4c show schematic views of a fitting part 1 according to an exemplary second embodiment of the present invention. The second embodiment is essentially the same as the first embodiment, wherein in contrast the fitting part 1 according to the second embodiment comprises multiple opposing detent elements 16, here a first opposing detent element 16', a second opposing detent element 16" and a third opposing detent element 16'". The three opposing detent elements 16', 16", 16'" are arranged one next to the other in the transverse direction 102, which runs perpendicularly with respect to the direction 101 of main extent and parallel to the flap element 3. The flap element 3 also has a plurality of detents, a first detent 14, a second detent 15 and a third detent 21, which are also arranged partially one next to the other or overlapping one another in a direction parallel to the transverse direction 102. The first detent 14 is arranged in the transverse direction 102 at the level of the first opposing detent element 16', the second detent 15 at the level of the second opposing detent element 16" and the third detent 21 at the level of the third opposing detent element 16'". In contrast to the opposing detent elements 16', 16", 16'" the detents 14, 15 and 21 are arranged at least slightly offset with respect to one another in the direction 101 of main extent. For the sake of illustration of the detents 14, 15 and 21, the slide 7 is not illustrated in FIG. 4c.

In a first use position, the first detent 14 is then in engagement with the first opposing detent element 16', while owing to the offset between the detents 14, 15, 21 the second detent 15 is disengaged from the second opposing detent element 16", and the third detent 21 is disengaged from the third opposing detent element 16'". In a second use position, the second detent 15 is then in engagement with the second opposing detent element 16", while owing to the offset between the detents 14, 15, 21 the first detent 14 is disengaged from the first opposing detent element 16' and the third detent 21 is disengaged from the third opposing detent element 16'". Analogously, in a third use position the third detent 21 is in engagement with the third opposing detent element 16'", while owing to the offset between the detents 14, 15, 21 the first detent 14 is disengaged from the first opposing detent element 16' and the second detent 15 is disengaged from the second opposing detent element 16". Since the detents 14, 15, 21 are offset with respect to one another in the transverse direction 102, a relatively small offset in comparison with the first embodiment in the direction 101 of main extent can be implemented between the detents 14, 15, 21. The first, second and third use positions are therefore located near to one another, with the result that a comparatively fine angular correction of the orientation of the flap element 3 is possible. The first, second and third use positions are very close to one another in terms of the difference in angles here. It is conceivable that the fitting part has a plurality of such arrangements composed of first, second and third detents 14, 15, 21 which are arranged in a row one behind the other in the direction 101 of main extent. In this way, a very large number of different use positions can be brought about.

FIGS. 5a, 5b and 5c show schematic views of a fitting part 1 according to an exemplary third embodiment of the present invention. The third embodiment is also essentially the same as the first embodiment, wherein in contrast the fitting part 1 according to the third embodiment preferably has just one detent 14 which latches with the one opposing detent element 16 in the use position, and the slide 7 comprises a functional cam 22 which functions as a control cam and in which the second region 13 of the retainer element 11 is mounted. Accordingly, the slide 7 can be slid not only in a rotational fashion but also in a translational fashion relative to the second region 13. Furthermore, each wall element 8 of the rail arrangement 6 also has in each case a further functional cam 23 which functions as a control cam, wherein the wall of the guide elongate hole 9 is provided for this purpose with a cutout 24 which is formed on a side of the guide elongate hole 9 which faces away from the flap element 3 and faces the backrest 5 in the non-use position.

In FIGS. 5a, 5b and 5c the flap element 3 is arranged in the non-use position, with the result that the flap element 4 extends essentially parallel to the backrest 5. If the flap element 3 is then pivoted by a vehicle occupant in the direction of a first use position, the slide 7 slides in the direction of the second end 18 of the rail arrangement 6, and the opposing detent element 16 of the slide 7 latches with the one detent 14 (also referred to as a functional position). The slide 7 is therefore fixed at the second end 18. The functional cam 22 and the further functional cam 23 are then precisely congruent in the transverse direction 102. During this movement, the second region 13 of the retainer element 11 slips along a side, facing away from the flap element 3, of the guide elongate hole 9. When the retainer element 11 and the slide 7 reach the second end 18, the second region 13 is therefore moved into the cutout 24. In a first use position, the flap element 3 is supported with a first angle with respect to the backrest 5 by the retainer element 11, wherein in the first use position the second region 13 is supported against a projection 25 which protrudes into the functional cams 22, 23. If the vehicle occupant slightly lifts up the flap element 3 out of the first use position and releases it again, the second region 13 slips over the projection 25 and subsequently bears, as in the first embodiment, against the end stops 19 of the guide elongate holes 9. The flap element 3 is then supported by the retainer element 11 and is located in a second use position. However, the angle between the flap element 3 and the backrest 5 differs in the second use position from the first use position, with the result that any inclination adjustment of the backrest 3 can be compensated, and the flap element 3 can be fixed in a horizontal orientation. It is conceivable that the functional cams are provided with a plurality of such latching positions of the second region 13 of the retainer element 11, with the result that more than two use positions can be implemented. In particular, guide elongate holes 9 have a plurality of cutouts 24 for this purpose.

While specific embodiments of the invention have been shown and described in detail to illustrate the application of the principles of the invention, it will be understood that the invention may be embodied otherwise without departing from such principles.

The invention claimed is:

1. A fitting part for a vehicle seat, the fitting part comprising:
   a flap element which is rotatably secured to a backrest of the vehicle seat and which can be pivoted between a substantially horizontal use position and a non-use position, the flap element comprising a rail arrangement;
   a retainer element for locking the flap element in the use position;
   a slide, wherein a first region of the retainer element is rotatably secured to the backrest, and wherein a second region of the retainer element is rotatably secured to the slide which is slidably mounted in the rail arrangement of the flap element; and
   a plurality of securing elements for locking the flap element in a plurality of use positions relative to the rail arrangement wherein:
   the plurality of securing elements comprise a plurality of detents, wherein each detent is provided for latching with the slide in one of the plurality of use positions; and
   the detents are each formed on a side of the flap element facing the rail arrangement, and/or the detents are arranged in a row in a direction of main extent of the rail arrangement.

2. The fitting part as claimed in claim 1, wherein the slide has at least one opposing detent element which faces the flap element and is configured to optionally latch with one of the detents.

3. The fitting part as claimed in claim 2, wherein at least a first detent and a second detent are offset with respect to one another in a transverse direction which is perpendicular to the direction of main extent, and wherein the slide has at least a first opposing detent element and a second opposing detent element which are offset with respect to one another in the transverse direction, wherein the first and the second detents and/or the first and the second opposing detent elements are offset with respect to one another in the direction of main extent.

4. A fitting part for a vehicle seat, the fitting part comprising:
- a flap element which is rotatably secured to a backrest of the vehicle seat and which can be pivoted between a substantially horizontal use position and a non-use position, the flap element comprising a rail arrangement;
- a retainer element for locking the flap element in the use position;
- a slide, wherein a first region of the retainer element is rotatably secured to the backrest, and wherein a second region of the retainer element is rotatably secured to the slide which is slidably mounted in the rail arrangement of the flap element; and
- a plurality of securing elements for locking the flap element in a plurality of use positions relative to the rail arrangement, wherein the slide has a slide functional cam in which the second region of the retainer element is guided in such a way that the second region can be fixed in at least two different positions relative to the slide in order to lock the flap element in at least two use positions.

5. The fitting part as claimed in claim 4, wherein the rail arrangement comprises a further functional cam which is arranged essentially congruently with the slide functional cam when the slide has assumed a functional position relative to the rail arrangement, wherein in the functional position one detent of the flap element is latched to an opposing detent element of the slide, and the flap element is arranged substantially horizontally.

6. The fitting part as claimed in claim 4, wherein the rail arrangement has an elongate hole guide which extends in the direction of main extent and in which a guide bolt of the slide and/or the retainer element which is connected to the slide is displaceably guided, wherein the elongate hole guide has in an end region at least one cutout for forming the functional cam.

7. A fitting part for a vehicle seat, the fitting part comprising:
- a flap element which is rotatably secured to a backrest of the vehicle seat and which can be pivoted between a substantially horizontal use position and a non-use position, the flap element comprising a rail arrangement;
- a retainer element for locking the flap element in the use position;
- a slide, wherein a first region of the retainer element is rotatably secured to the backrest, and wherein a second region of the retainer element is rotatably secured to the slide which is slidably mounted in the rail arrangement of the flap element; and
- a plurality of securing elements for locking the flap element in a plurality of use positions relative to the rail arrangement, wherein the retainer element is embodied as a wire clip, and/or the flap element comprises a tabletop.

* * * * *